United States Patent [19]
Borkenhagen et al.

[11] Patent Number: 5,790,843
[45] Date of Patent: Aug. 4, 1998

[54] SYSTEM FOR MODIFYING MICROPROCESSOR OPERATIONS INDEPENDENTLY OF THE EXECUTION UNIT UPON DETECTION OF PRESELECTED OPCODES

[75] Inventors: John Michael Borkenhagen; William Thomas Flynn; Philip Rodgers Hillier, III; Andrew Henry Wottreng, all of Rochester, Minn.

[73] Assignee: International Business Machines Corporation, Armonk, N.Y.

[21] Appl. No.: 718,180

[22] Filed: Sep. 19, 1996

[51] Int. Cl.$^6$ .................................................. G06F 9/00
[52] U.S. Cl. ................................................... 395/567
[58] Field of Search ..................... 711/115; 395/567, 395/598

[56] References Cited

U.S. PATENT DOCUMENTS

| | | | |
|---|---|---|---|
| 4,095,278 | 6/1978 | Kihara | 395/567 |
| 4,109,311 | 8/1978 | Blum et al. | 395/567 |
| 4,439,828 | 3/1984 | Martin | 395/567 |
| 4,542,453 | 9/1985 | Patrick et al. | 395/182.06 |
| 4,802,119 | 1/1989 | Heene et al. | 395/182.05 |
| 4,974,147 | 11/1990 | Hanrahan et al. | |
| 5,042,005 | 8/1991 | Miller et al. | |
| 5,075,845 | 12/1991 | Lai et al. | |
| 5,390,304 | 2/1995 | Leach et al. | |
| 5,426,746 | 6/1995 | Sekignchi | 395/598 |
| 5,448,744 | 9/1995 | Eifert et al. | |
| 5,473,754 | 12/1995 | Folwell et al. | |

OTHER PUBLICATIONS

M. Berg et al., Enterprise Address Book Shadowing, vol. 35 No. 1B, Jun. 1992.

J.M. Borkenhagen and W.T. Flynn, N-Way Superscalar N-Deep Pipeline Processing Control Register, vol. 37 No. 06A, Jun. 1994.

J.T. Bridges et al., Efficient Mechanism for Multiple Debug Modes, vol. 38, No. 11, Nov. 1995.

H.Q. Le, Opcode Compare Facility, Research Disclosure, Jul. 1990, No. 315.

*Primary Examiner*—Richard L. Ellis
*Attorney, Agent, or Firm*—Schmeiser, Olsen & Watts; Michael F. Hoffman

[57] ABSTRACT

Described herein is a system and method for providing instruction dependent execution control on a microprocessor device. The system and method utilize instruction match register/execution control register (IMR/ECR) pairs to first identify known problematic instructions and to then alter control of the microprocessor in a preselected manner when processing each problematic instruction. The invention contemplates the use of numerous control options for altering control of the microprocessor.

32 Claims, 3 Drawing Sheets

SYSTEM FOR MODIFYING MICROPROCESSOR OPERATIONS INDEPENDENTLY OF THE EXECUTION UNIT UPON DETECTION OF PRESELECTED OPCODES

FIELD OF THE INVENTION

The present invention relates to integrated circuit devices. More particularly, the present invention relates to a system and method of debugging integrated circuit devices.

BACKGROUND OF THE INVENTION

As integrated circuit devices, particularly microprocessors, become more complex, the ability to identify and correct, or work-around hardware errors becomes increasingly more difficult. The importance of correcting such errors early in the design cycle is critical in order to avoid delays in product releases or avoid the need for costly software updates. Design errors (i.e., "bugs") causing instruction execution problems in microprocessors are often found throughout the debug stage of processor development. As long as bugs can be identified and addressed at an early stage, the overall cost and time frame of releasing the microprocessor and related software are not substantially affected.

Happening less frequently, but usually with more critical ramifications, are errors found after the product has been released. For most of the problems, a software solution (i.e., a "work-around" or "patch") can be found, but this usually has some high costs. At a minimum, it requires time to identify methods of avoiding the bug, rewriting software to include a work-around, thoroughly testing the new software and delivering updated versions to all users. Unfortunately, the complex microprocessors of today may have extremely complex bugs that are difficult to identify and work-around. Moreover, work-arounds may severely affect the operation of the microprocessor and limit the effectiveness of the overall debug process by hiding errors.

Various microprocessor devices, such as certain versions of the Power PC processors, include special registers that can be used to force an instruction to be interpreted as an illegal instruction based on a compare between the instruction opcode bits and the opcode and mask bits set in the special register. These special registers, referred to as instruction match registers (IMR's), provide a possible work-around solution because they allow instructions to be trapped and emulated in software to avoid a known hardware bug. Unfortunately, IMR's fail to provide enough flexibility to allow for a permanent solution if an error was found late in the design cycle. Moreover, the use of software emulation has a potentially severe impact on the performance of the microprocessor.

Another known method for identifying and working around execution problems involves altering the normal pipeline execution scheme of the microprocessor. Often, a hardware bug can be avoided by changing the way the microprocessor handles the pipelining of instructions. Built in hardware for altering pipeline execution exists on many microprocessors in the form of a Pipeline Control Register or the like. This type of work-around represents some improvement over the use of software traps because the modification is hardware-based. Unfortunately, this type of solution "permanently" forces the microprocessor to operate in a degraded pipeline execution mode, thereby raising numerous performance issues. In particular, instruction sequences that are not affected by the bug are forced to execute in a mode that is less than ideal. Moreover, this type of work-around increases the chances of hiding unrelated errors. In summary, the use of the pipeline control register to avoid hardware bugs also fails to provide the flexibility required in debugging and working around known bugs.

Thus, a need exists to provide a debug solution wherein individual instructions can be recognized as problematic, and a preselected "temporary" processing modification may occur. All of the above identified art is herein incorporated by reference.

SUMMARY OF THE INVENTION

The present invention provides a system and method of achieving increased flexibility in performing debugging functions on a microprocessor. Improved debugging capabilities are achieved by providing a microprocessor device with an instruction match register for storing a predetermined binary opcode, an instruction matching system for comparing the predetermined binary opcode with each instruction being executed on the microprocessor, an execution control register for storing a control code, and an execution control system for temporarily altering the operation of the microprocessor based on the control code stored in the execution control register. Altering the operation of the microprocessor device may include modifying the instruction dispatch process, modifying the instruction execution process, forcing instruction cache misses, delaying restarts in the microprocessor or any other modification that may enhance debugging operations.

The method of performing enhanced debugging includes the steps of loading an opcode into an instruction match register, loading a control code into the execution control register (ECR) wherein the control code is associated with one of a plurality of non-uniform microprocessor operations, comparing the opcode with each instruction being dispatched for execution, and upon a match between the opcode and one of the instructions being dispatched for execution, performing one of the non-uniform microprocessor operations associated with the loaded control code.

The invention further contemplates the use of multiple instruction match register/execution control register pairs to allow for the identification of more than one problematic instruction or instruction sequence. Thus, because each of a plurality of IMR's will include an associated ECR, the microprocessor operation can be altered in a different manner for different "problematic" instructions. The use of multiple register pairs may also be combined to identify problematic instructions sequences and take action based thereon.

It is therefore an advantage of the present invention to provide a work-around system wherein specific microprocessor actions can be taken for instructions identified as problematic.

It is therefore a further advantage of the present invention to provide a microprocessor device whose operation can be temporarily altered if a predetermined instruction is to be executed.

It is therefore a further advantage of the present invention to provide a microprocessor device that includes an execution control register for each instruction match register on the device.

It is therefore a further advantage of the present invention to provide an enhanced method of debugging and working around hardware errors on the microprocessor.

It is therefore a further advantage of the present invention to provide easy software work-around solutions for microprocessor bugs.

It is therefore a further advantage of the present invention to provide a microprocessor device that includes means for altering normal operation of the microprocessor.

It is therefore a further advantage of the present invention to provide a means for providing software fixes that will result in a very small performance penalty.

DESCRIPTION OF THE PREFERRED EMBODIMENT

Figure 1:
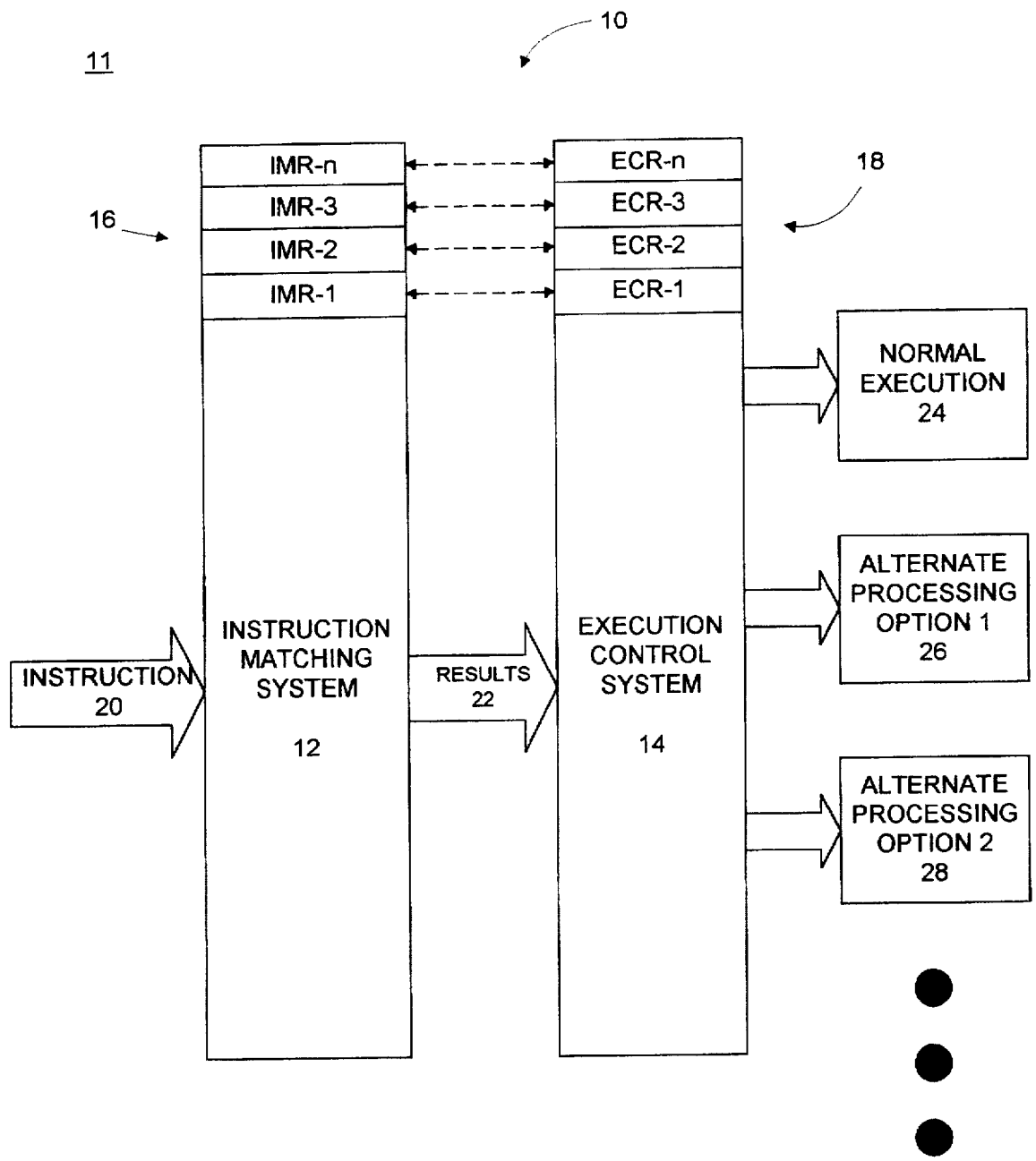
FIG. 1 depicts a high level block diagram of an instruction dependent execution system in accordance with a preferred embodiment of the present invention.

Referring now to the drawings, FIG. 1 depicts a high level block diagram of an instruction dependent execution control system 10 that is part of microprocessor 11. The system 10 includes two fundamental components, and instruction matching system 12 and an execution control system 14. The instruction matching system includes, or is in communication with, one or more instruction match registers (IMR's) 16. Execution control system 14 includes, or is in communication with, at least one execution control register (ECR's) 18. Note that each IMR is logically coupled to an associated EMR in a one-to-one correspondence. In general, the instruction matching system or means 12 is utilized to watch for known problematic instructions and the execution control system 14 is utilized to alter microprocessor control for processing the identified problematic instructions.

Prior to the execution of each instruction 20 on microprocessor device 11, the instruction 20 is fed into the instruction matching system 12. The instruction 20 is compared with one or more instruction opcodes located in IMR's 16. For debugging or work around purposes, IMR's 16 can be loaded with "problematic" instruction opcodes (i.e., opcodes that cause hardware errors to occur). The results 22 of the compare operations performed by the instruction matching system 12 are then forwarded to an execution control system 14. If a match occurred between the instruction 20 and one of the instruction opcodes in the IMR's 16, the execution control system 14 looks to the corresponding ECR 18 for a control code that tells the execution control system 14 how to proceed with the processing of instruction 20. Thus, for example, if instruction 20 matched IMR-3, the execution control system or means would look in ECR-3 for a control code for direction on how to process instruction 20. If instruction 20 did not match any of the instruction opcodes located in IMR's 16, the microprocessor will generally continue with its normal execution 24.

Each alternate processing option (e.g., 26, 28, etc.) is associated with a specific control code that is loaded by the user (either directly or through software). Examples of alternate processing options include any possible type of hardware implemented control modifications that the chip designer elects to include. For example, these control options may affect dispatching, execution, cache operations, timing, or combinations of the above. Possible control options that affect dispatching include dispatching the instruction normally, dispatching the instruction alone (no multiple dispatch), dispatching the instruction alone and delayed (e.g., wait for one or more of the subsequent pipe stages to empty). Examples of control options that affect execution include aborting subsequent instructions and restarting the pipeline; aborting subsequent instructions, performing a context synchronize and restarting the pipeline; aborting subsequent instructions, super synchronizing, and restarting (super synchronizing may include waiting for all outstanding instruction cache misses, etc. to complete in addition to normal context synchronization as defined by the Power PC architecture); aborting current and subsequent instructions and restarting to a next instruction; and aborting current instructions and interrupting to illegal instruction interrupt vectors or alternate interrupt vectors. Options for alternate interrupt vectors may include separate vectors for each IMR or separate vectors based on the matching instructions opcode (the vector called would then have knowledge of which instruction(s) took the interrupt) or disabling an IMR match for one instruction after return from interrupt (the interrupt return can then execute the instruction that caused the match without getting another match interrupt). Additional control options include the ability to force an instruction cache miss on the fetch for restart/interrupt, delaying the restart by n-cycles, combining two IMR's into a pair, wherein the hardware must detect a match on the first IMR and then the second within a specified number of instructions.

These schemes allows cycles to be inserted before and/or after any instruction matching an IMR, which is often enough to fix an error. They can be used to patch errors and allow debugging to proceed with less chance of hiding unrelated errors. Moreover, there is enough flexibility to allow a permanent fix to be made with no software intervention and only a small performance impact.

In summary, enhanced debugging is accomplished within system 10 by first identifying instructions that are causing execution errors. Those instructions can then be loaded into one of the n IMR's 16. Thus, problematic instructions can be identified prior to execution and an alternate execution/processing option can be implemented to avoid the error. Along with each identified problematic instruction inserted into one of the n IMR's 16, an associated control code must be loaded into one of the n ECR's 18. Thus, the system utilizes one or more IMR/ECR pairs to effectuate the desired result. Therefore, not only can the user choose what instructions to look for, but can also tell the microprocessor how to process each of those identified instructions. It should be recognized that the number of IMR/ECR pairs is not limited.

Figure 2:
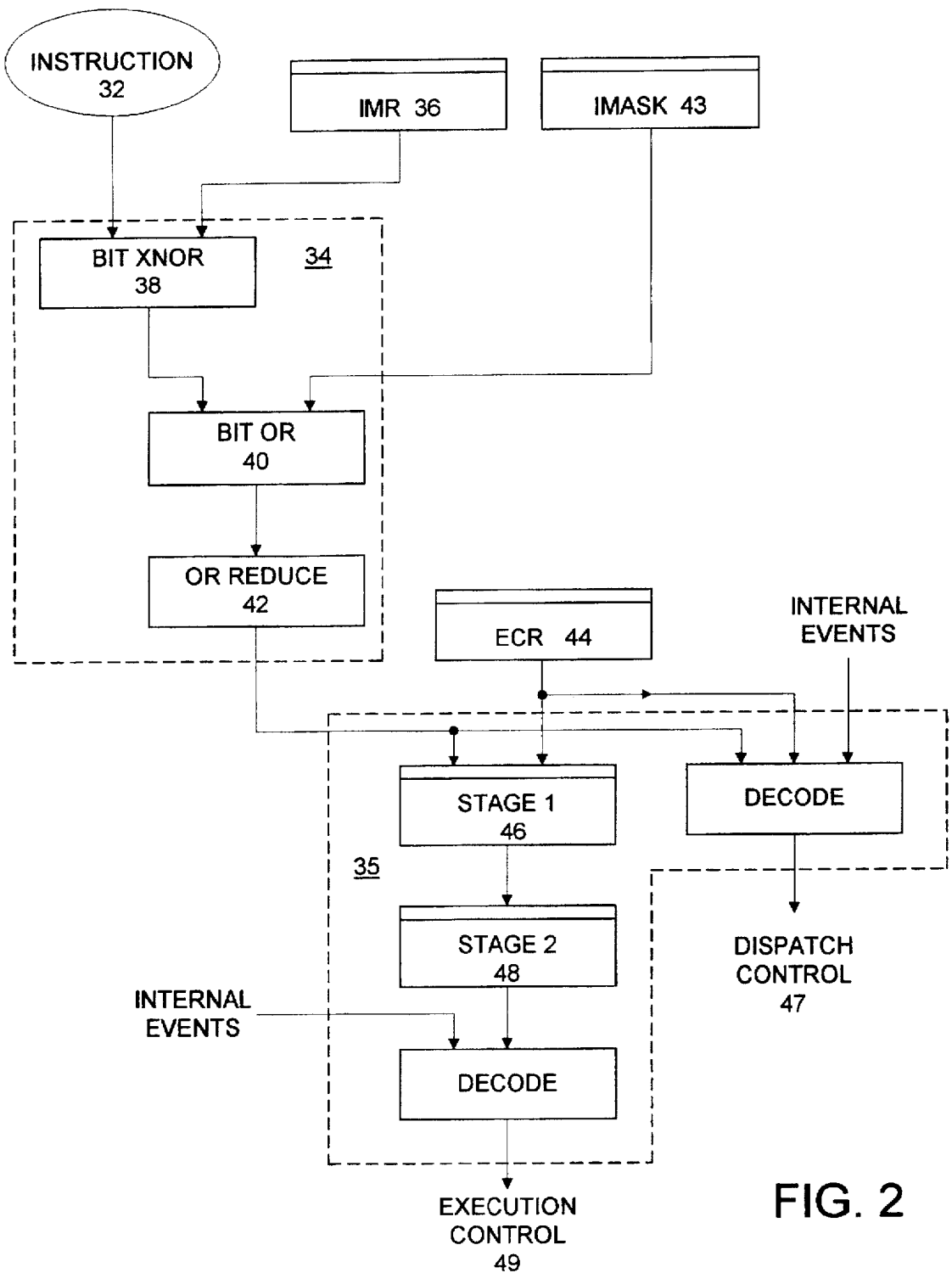
FIG. 2 depicts a low level block diagram of an instruction dependent execution system in accordance with a preferred embodiment of the present invention.

Referring now to FIG. 2, a low level block diagram showing a preferred embodiment of the system shown in FIG. 1 is depicted for a system with a single IMR/ECR pair. Instruction 32 is fed into instruction matching logic 34 which compares the instruction with an opcode loaded into IMR 36. This bit-wise compare may be done with BIT XNOR logic 38 as shown or any other known method. The results of that bit-wise compare are then fed into a second compare stage 40 in which it is OR'd with an IMASK 43. The use of IMASK 43 allows groups or families of instructions that perform similar functions (and have similar opcodes) to be identified as problematic. This compare may be done with BIT OR logic 40 or any other known system. The results of the BIT OR operation are then fed into OR REDUCE logic 42 which essentially outputs either a one or a zero to execution control system 35 to indicate whether or not a match between instruction 32 and IMR 36 occurred. If no match occurred, the instruction will generally be executed in a normal fashion. However, if a match did occur, the control code stored in ECR 44 will either be immediately decoded and alter dispatch control 47 or be fed through a series of delay type stages 46, 48 and later decoded to alter execution control 49. The decoding of ECR to alter dispatch control or execution control may also be influenced by internal events occurring on the microprocessor at that time. It is recognized that the logic shown in FIG. 2 represents one of many possible implementations of the invention. In addition, it is recognized that a plurality of IMR/ECR pairs may be implemented.

Figure 3:
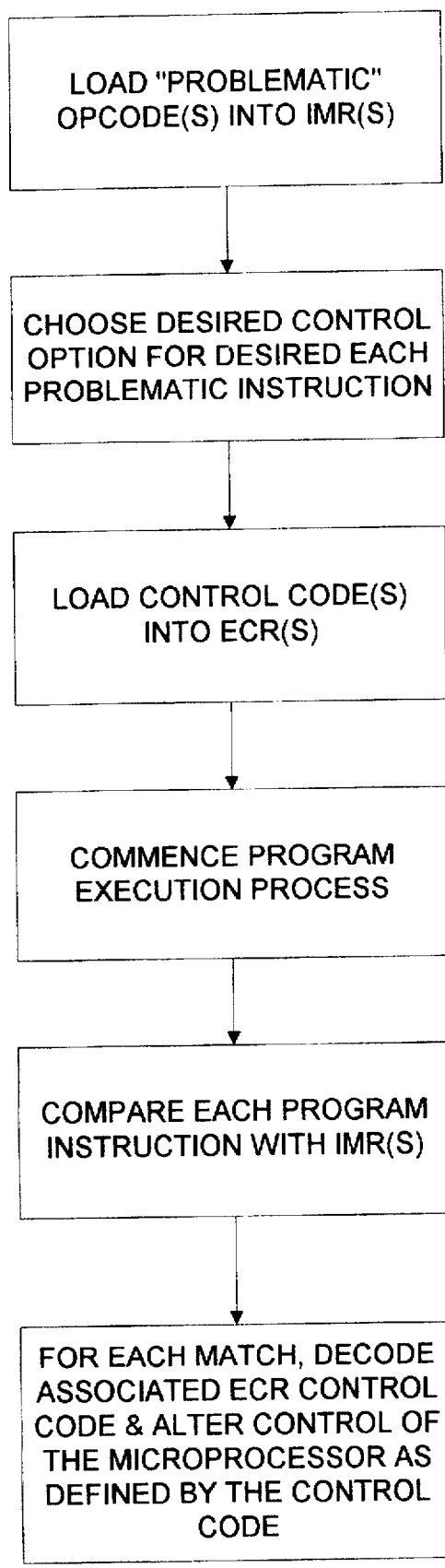
FIG. 3 depicts a flow diagram of a method of performing instruction dependent execution in accordance with a preferred embodiment of the present invention.

Referring now to FIG. 3, a flow chart is shown depicting a method of implementing instruction dependent execution control. First, specific opcodes are selected and loaded into IMR's. Typically, "problematic" opcodes (i.e., instruction opcodes that cause hardware errors) are loaded into the IMR. Next, the desired control options for processing each of the problematic opcodes are chosen and their associated control codes are loaded into the respective ECR's. Next, program execution is commenced and each program instruction, prior to its execution, is compared with the opcodes in each of the IMR's. Then, for each match detected, the control code located in the ECR (associated with the matched IMR) is decoded and control of the microprocessor is altered as defined by the control code.

The system and methodology described with respect to the prior three figures provides a flexible yet powerful method of pinpointing and working around hardware bugs. Flexibility is achieved because the user can not only choose which instructions are problematic, but can also determine how the processor should handle each problematic instruction. Because the user can choose from a plurality of control options, the user can readily implement the best possible work-around while minimizing the effect on system performance.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

We claim:

1. A microprocessor device comprising:
   an instruction match register, said instruction match register having a first memory location for storing a predetermined binary opcode;
   an instruction matching system, said instruction matching system having a compare apparatus for comparing said predetermined binary opcode with each of a plurality of program instructions;
   an execution control register, said execution control system having a second memory location for storing one of a plurality of control codes; and
   an execution control system, said execution control system including logic for detecting a match from said instruction matching system, decoding logic for decoding said control code, and control logic for forcing one of a plurality of alternate microprocessor operations, wherein at least one the plurality of alternate microprocessor operations causes the microprocessor device to execute each of the plurality of program instructions with a predetermined alteration to the timing of the execution.

2. The microprocessor device of claim 1 wherein said plurality of alternate microprocessor operations includes an instruction dispatch process.

3. The microprocessor device of claim 2 wherein said instruction dispatch process dispatches a specified instruction normally.

4. The microprocessor device of claim 2 wherein said instruction dispatch process dispatches a specified instruction alone in a single clock cycle.

5. The microprocessor device of claim 2 wherein said instruction dispatch process dispatches a specified instruction alone in a single clock cycle with a delay.

6. The microprocessor device of claim 1 further comprising a pipeline, and wherein said plurality of alternate microprocessor operations include an instruction execution process.

7. The microprocessor device of claim 6 wherein said instruction execution process aborts a subsequent instruction and restarts said pipeline.

8. The microprocessor device of claim 6 wherein said instruction execution process aborts a subsequent instruction, performs a context synchronize operation and restarts said pipeline.

9. The microprocessor device of claim 6 wherein said instruction execution process aborts a subsequent instruction, performs a super synchronized operation and restarts said pipeline.

10. The microprocessor device of claim 6 wherein said instruction execution process aborts a current and any subsequent instructions in said pipeline and restarts with said current instruction.

11. The microprocessor device of claim 6 wherein said instruction execution process aborts a current instruction and interrupts to a predetermined interrupt vector.

12. The microprocessor device of claim 1 wherein said of plurality of alternate microprocessor operations include means for forcing an instruction cache miss.

13. The microprocessor device of claim 1 wherein said plurality of alternate microprocessor operations include means for delaying a restart by a predetermined number of cycles.

14. A microprocessor device comprising:
   instruction matching means for comparing preselected binary opcodes with a plurality of program instructions prior to an execution of each of said program instructions;
   execution means for executing program instructions; and
   execution control means for causing one of a plurality of preselected modified microprocessor operations upon the occurrence of a match by said instruction matching means, wherein the preselected modified microprocessor operation operates independently of the execution means.

15. The microprocessor device of claim 14 wherein said execution control means is dependent upon a predetermined value stored in an execution control register.

16. The microprocessor device of claim 14 wherein said execution control means includes means for controlling the dispatching of program instructions.

17. The microprocessor device of claim 14 wherein said execution control means includes means for controlling the execution of program instructions.

18. The microprocessor device of claim 14 wherein said execution control means includes means to force an instruction cache miss on a fetch for restart/interrupt.

19. The microprocessor device of claim 14 wherein said execution control means includes means to force a delay in a restart by a predetermined number of cycles.

20. The microprocessor device of claim 14 wherein said instruction matching means includes an imask register.

21. A method for realizing instruction-dependent execution control on a microprocessor that includes an instruction match register and an accompanying execution control register, said method comprising the steps of:

loading an instruction opcode into said instruction match register;

choosing one of a plurality of control options for handling program instructions that match said instruction opcode loaded into said instruction match register;

loading a control code into said execution control register wherein said control codes includes encoded information to effectuate said chosen control option;

commencing execution of a stream of program instructions;

prior to the execution of each program instruction in said stream of program instructions, comparing each instruction with said instruction opcode loaded into said instruction match register; and upon a match between one of said program instructions and said instruction opcode, decoding said control code loaded into said execution control register and then altering microprocessor control such that the matched program instruction is executed with a predetermined timing alteration.

22. The method of claim 21 wherein said microprocessor includes a plurality of instruction match registers wherein each instruction match register has an associated execution control register.

23. The method of claim 21 wherein said step of altering microprocessor control includes the step of causing a non-uniform dispatch operation.

24. The method of claim 21 wherein said step of altering microprocessor control includes the step of causing a non-uniform execution operation.

25. The method of claim 21 wherein said step of altering microprocessor control includes the step of causing an instruction cache miss on a fetch for restart.

26. The method of claim 21 wherein said step of altering microprocessor control includes the step of delaying a restart by a predetermined number of cycles.

27. A microprocessor device comprising:

a plurality of instruction match registers for storing a plurality of instruction opcodes;

an instruction matching system, said instruction matching system for comparing each of said plurality of program instructions with each of said plurality of instruction opcodes;

a plurality of execution control registers for storing a plurality of control codes wherein each of said plurality of execution control registers is logically coupled to one of said plurality of instruction match registers; and an execution control system, said execution control system including:

decoding logic for decoding one of said control codes when a program instruction match occurs in an associated instruction match register;

control logic for altering control of said microprocessor device when processing said matched program instruction; and detecting logic for determining whether a match occurred in two or more instruction match registers within a predetermined time frame.

28. The microprocessor device of claim 27 wherein each instruction match register includes an associated IMASK register.

29. The microprocessor device of claim 27 wherein said control logic includes logic for altering instruction dispatch.

30. The microprocessor device of claim 27 wherein said control logic includes logic for altering processor execution.

31. The microprocessor device of claim 27 wherein said control logic includes logic for forcing an instruction cache miss on a fetch for a restart.

32. The microprocessor device of claim 27 wherein said control logic includes logic for delaying a restart by a predetermined number of cycles.

* * * * *